US011372684B2

(12) United States Patent
Smith et al.

(10) Patent No.: US 11,372,684 B2
(45) Date of Patent: *Jun. 28, 2022

(54) TECHNOLOGIES FOR HYBRID FIELD-PROGRAMMABLE GATE ARRAY APPLICATION-SPECIFIC INTEGRATED CIRCUIT CODE ACCELERATION

(71) Applicant: Intel Corporation, Santa Clara, CA (US)

(72) Inventors: Ned M. Smith, Beaverton, OR (US); Changzheng Wei, Shanghai (CN); Songwu Shen, Shanghai (CN); Ziye Yang, Shanghai (CN); Junyuan Wang, Shanghai (CN); Weigang Li, Shanghai (CN); Wenqian Yu, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/220,763

(22) Filed: Apr. 1, 2021

(65) Prior Publication Data

US 2021/0326182 A1 Oct. 21, 2021

Related U.S. Application Data

(63) Continuation of application No. 15/755,216, filed as application No. PCT/CN2017/078472 on Mar. 28, 2017, now Pat. No. 10,970,119.

(51) Int. Cl.
*G06F 9/50* (2006.01)
*G06F 21/76* (2013.01)
*G06F 21/60* (2013.01)

(52) U.S. Cl.
CPC ............ *G06F 9/5044* (2013.01); *G06F 9/505* (2013.01); *G06F 21/76* (2013.01); *G06F 21/602* (2013.01); *G06F 2209/509* (2013.01)

(58) Field of Classification Search
None
See application file for complete search history.

(56) References Cited

U.S. PATENT DOCUMENTS 7,546,441 B1 6/2009 Ansari et al.
9,910,705 B1 3/2018 Mak
(Continued)

FOREIGN PATENT DOCUMENTS

WO 9956394 A1 11/1999
WO 2015042684 A1 4/2015
WO 2018176238 A1 10/2018

OTHER PUBLICATIONS

PCT Search Report and Written Opinion for PCT/CN2017/078472, completed Dec. 26, 2017.
(Continued)

*Primary Examiner* — Steven G Snyder
(74) *Attorney, Agent, or Firm* — Jaffery Watson Mendonsa & Hamilton LLP (57) ABSTRACT

Technologies for hybrid acceleration of code include a computing device (100) having a processor (120), a field-programmable gate array (FPGA) (130), and an application-specific integrated circuit (ASIC) (132). The computing device (100) offloads a service request, such as a cryptographic request or a packet processing request, to the FPGA (130). The FPGA (130) performs one or more algorithmic tasks of an algorithm to perform the service request. The FPGA (130) determines one or more primitive tasks associated with an algorithm task and encapsulates each primitive task in a buffer that is accessible by the ASIC (132). The ASIC (132) performs the primitive tasks in response to encapsulation in the buffer, and the FPGA (130) returns results of the algorithm. The primitive operations may include cryptographic primitives such as modular exponentiation, modular multiplicative inverse, and modular multi-
(Continued)

plication. The results may be returned to the processor (120) or a network interface controller of the computing device (100).

20 Claims, 5 Drawing Sheets

(56) References Cited

U.S. PATENT DOCUMENTS

| | | |
|---|---|---|
| 10,366,017 B2 | 7/2019 | Abramson et al. |
| 10,686,872 B2 * | 6/2020 | Pope .................. H04L 49/30 |
| 10,728,091 B2 | 7/2020 | Zhao et al. |
| 11,042,413 B1 * | 6/2021 | Byagowi ................ G06F 9/5027 |
| 11,042,414 B1 * | 6/2021 | Byagowi ................ G06F 9/5055 |
| 2005/0038946 A1 | 2/2005 | Borden |
| 2008/0065835 A1 | 3/2008 | Iacobovici et al. |
| 2008/0204074 A1 | 8/2008 | Chan et al. |
| 2009/0198483 A1 | 8/2009 | Uysal |
| 2015/0178136 A1 | 6/2015 | Sinha et al. |
| 2018/0150334 A1 | 5/2018 | Bernat et al. |
| 2018/0150654 A1 | 5/2018 | Connor et al. |
| 2018/0196698 A1 | 7/2018 | Mak |
| 2019/0026146 A1 | 1/2019 | Peffers et al. |
| 2019/0042483 A1 | 2/2019 | Abramson et al. |
| 2019/0228166 A1 | 7/2019 | Smith et al. |
| 2019/0312772 A1 | 10/2019 | Zhao et al. |
| 2019/0391855 A1 | 12/2019 | Bernat et al. |
| 2020/0092267 A1 | 3/2020 | Boivie et al. |
| 2020/0142753 A1 | 5/2020 | Harwood et al. |
| 2020/0192757 A1 | 6/2020 | Qin et al. |

OTHER PUBLICATIONS

"In memory database acceleration on FPGA's: a survery", by Jian Fang, et al., Published online Oct. 26, 2019, (Year 2019).

* cited by examiner

TECHNOLOGIES FOR HYBRID FIELD-PROGRAMMABLE GATE ARRAY APPLICATION-SPECIFIC INTEGRATED CIRCUIT CODE ACCELERATION

CROSS REFERENCE TO RELATED APPLICATIONS

This Application is a continuation of and claims the benefit of and priority to U.S. application Ser. No. 15/755,216, entitled "TECHNOLOGIES FOR HYBRID FIELD-PROGRAMMABLE GATE ARRAY APPLICATION-SPECIFIC INTEGRATED CIRCUIT CODE ACCELERATION", by Ned M. Smith, et al., filed Feb. 26, 2018, now U.S. Pat. No. 10,970,119 with an issue date of Apr. 6, 2021, which claims the benefit of and priority to International Application No. PCT/CN2017/078472, filed Mar. 28, 2017, entitled "TECHNOLOGIES FOR HYBRID FIELD-PROGRAMMABLE GATE ARRAY-APPLICATION-SPECIFIC INTEGRATED CIRCUIT CODE ACCELERATION", published as WO 2018/176238 on Oct. 4, 2018, the entire contents of which are incorporated herein by reference.

BACKGROUND

Modern computing devices may include general-purpose processor cores as well as a variety of hardware accelerators for performing specialized tasks. Certain computing devices may include one or more field-programmable gate arrays (FPGAs), which may include programmable digital logic resources that may be configured by the end user or system integrator. Similarly, computing devices may include one or more application-specific integrated circuits (ASICs), which may provide improved performance and/or power efficiency compared to an equivalent FPGA. An FPGA may allow for improved flexibility, time-to-market, and/or power consumption compared to a pure ASIC solution.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
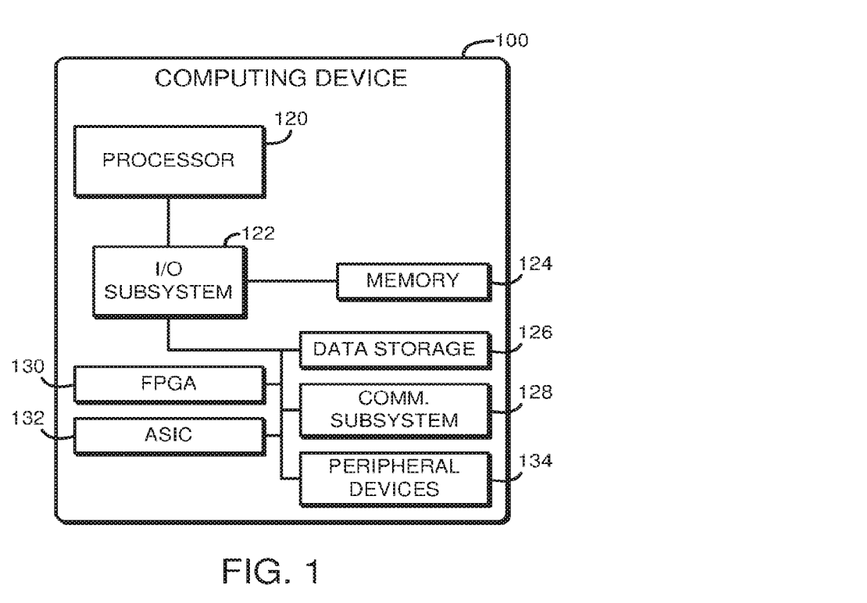
FIG. 1 is a simplified block diagram of at least one embodiment of a computing device for hybrid code acceleration with a field-programmable gate array and application-specific integrated circuit.

Referring now to FIG. 1, an illustrative computing device 100 for hybrid code acceleration includes a processor 120, a field-programmable gate array (FPGA) 130, and an application-specific integrated circuit (ASIC) 132. In use, as described below, the computing device 100 offloads a service request to the FPGA 130. The service request may be embodied as, for example, an encryption request from the processor 120, a packet processing request from the processor 120 and/or a network interface controller, or other service request. The FPGA 130 performs an algorithm, such as a cryptographic algorithm or packet-processing algorithm, to service the request. While performing the algorithm, the FPGA 130 may offload primitive operations to the ASIC 132. For example, the FPGA 130 may offload cryptographic mathematical operations such as modular exponentiation, modular multiplicative inverse, modular multiplication, or other computationally intensive operations. After performing the primitive operations, the FPGA 130 reports the results, for example reporting back to the processor 120. Thus, the computing device 100 may perform the requested algorithm with performance and power efficiency similar to an all-ASIC implementation while still retaining the flexibility of an all-FPGA implementation. For example, the algorithm logic of the FPGA 130 may be updated to process new cryptographic algorithms, cryptographic modes of operation, or key sizes, to comply with cryptographic regulatory requirements for different countries of the world, to process new packet formats or other packet processing algorithms, or with other updated algorithmic operations. Accordingly, the computing device 100 may provide flexible solutions even for constrained devices that include a low-cost ASIC, such as Internet-of-Things (IoT) devices.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 128, which may be embodied as any communication circuit, device, or collection thereof, capable of enabling communications between the computing device 100 and other remote devices over a computer network (not shown). For example, the communications subsystem 128 may be embodied as or otherwise include a network interface controller (NIC) for sending and/or receiving network data with remote devices. The communications subsystem 128 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication.

As shown in FIG. 1, the computing device 100 includes a field-programmable gate array (FPGA) 130. The FPGA 130 may be embodied as an integrated circuit including programmable digital logic resources that may be configured after manufacture. The FPGA 130 may include, for example, a configurable array of logic blocks in communication over a configurable data interchange. The FPGA 130 may be coupled to the processor 120 via a high-speed connection interface such as a peripheral bus (e.g., a PCI Express bus) or an inter-processor interconnect (e.g., an in-die interconnect (IDI) or QuickPath Interconnect (QPI)), via a fabric interconnect such as Intel® Omni-Path Architecture, or via any other appropriate interconnect. The computing device 100 further includes an application-specific integrated circuit (ASIC) 132. The ASIC 132 may be embodied as any digital logic, functional block, or other processing circuit capable of performing one or more predetermined operations. For example, the ASIC 132 may be configured to perform one or more primitive mathematical operations useful for cryptographic operations, such as modular exponentiation, modular multiplicative inverse, modular multiplication, elliptic curve cryptography (ECC) operations, zero-knowledge proof of knowledge, digital random number generation, or other operations. As another example, the ASIC 132 may be configured to perform one or more signal processing operations such as a fast Fourier transform (FFT) operations. The FPGA 130 and the ASIC 132 may be capable of communicating data via a high-speed connection interface such as PCI express, QPI, or other interconnect. In some embodiments, the FPGA 130 and the ASIC 132 may be capable of communicating via one or more common direct memory access (DMA) buffers. Additionally, although illustrated in FIG. 1 as discrete components separate from the processor 120 and/or the I/O subsystem 122, it should be understood that in some embodiments one or more of the FPGA 130, the ASIC 132, the processor 120, the I/O subsystem 122, and/or the memory 124 may be incorporated in the same package and/or in the same computer chip, for example in the same SoC. As another example, in some embodiments the FPGA 130 and the ASIC 132 may be included together in a hybrid offload engine.

The computing device 100 may further include one or more peripheral devices 134. The peripheral devices 134 may include any number of additional input/output devices, interface devices, and/or other peripheral devices. For example, in some embodiments, the peripheral devices 134 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

Figure 2:
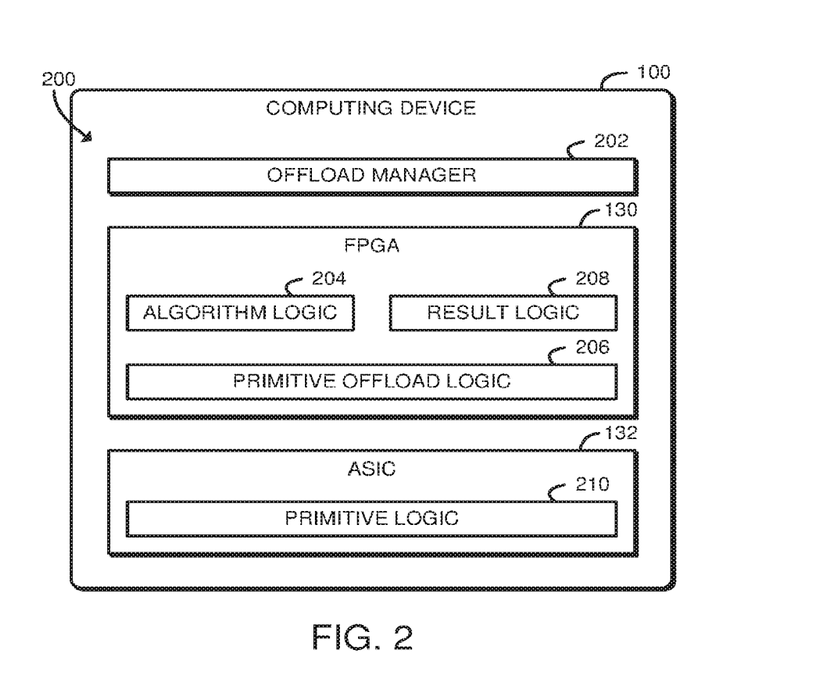
FIG. 2 is a simplified block diagram of at least one embodiment of an environment of the computing device of FIG. 1.

Referring now to FIG. 2, in an illustrative embodiment, the computing device 100 establishes an environment 200 during operation. The illustrative environment 200 includes an offload manager 202, algorithm logic 204, primitive offload logic 206, result logic 208, and primitive logic 210. The various components of the environment 200 may be embodied as hardware, firmware, software, or a combination thereof. As such, in some embodiments, one or more of the components of the environment 200 may be embodied as circuitry or collection of electrical devices (e.g., offload manager circuitry 202, algorithm logic circuitry 204, primitive offload logic circuitry 206, result logic circuitry 208, and/or primitive logic circuitry 210). It should be appreciated that, in such embodiments, one or more of the offload manager circuitry 202, the algorithm logic circuitry 204, the primitive offload logic circuitry 206, the result logic circuitry 208, and/or the primitive logic circuitry 210 may form a portion of the processor 120, the I/O subsystem 122, the FPGA 130, the ASIC 132, and/or other components of the computing device 100. Additionally, in some embodiments, one or more of the illustrative components may form a portion of another component and/or one or more of the illustrative components may be independent of one another.

The offload manager 202 is configured to offload a service request to the FPGA 130 of the computing device 100. In some embodiments, the service request may be offloaded from the processor 120 to the FPGA 130 and/or from a network interface controller of the computing device 100 to the FPGA 130. The service request may be embodied as, for example, a cryptographic service request, a packet processing service request, and/or a telecommunications service request.

The algorithm logic 204 is configured to perform one or more algorithm tasks of an algorithm to perform the service request. The algorithm may be embodied as, for example, a cryptographic algorithm or a cryptographic mode of operation, a packet processing algorithm such as a TCP/IP packet processing algorithm, or a modulation-demodulation algorithm. The algorithm logic 204 is further configured to determine one or more primitive tasks associated with the algorithm tasks. The algorithm logic 204 may be further configured to determine the one or more algorithm tasks of the algorithm in response to the service request being offloaded.

The primitive offload logic 206 is configured to encapsulate each primitive task in a buffer of the FPGA 130. The buffer is accessible by the ASIC 132 of the computing device. In some embodiments, the primitive offload logic 206 may include load balancing/failover logic that is configured to load-balance multiple primitive tasks among multiple computation resources of the ASIC 132 (e.g., multiple bit streams) or multiple ASICs 132. In some embodiments, the load balancing/failover logic may be configured to determine resources of the ASIC 132 are unavailable and, if so, perform the primitive task with resources of the FGPA 130.

The result logic 208 is configured to return one or more results of the service request in response performance of the one or more algorithm tasks and performance of the primitive task by the ASIC 132. Returning the results may include returning the results from the FPGA 130 to the processor 120 and/or forwarding the results from the FPGA 130 to a network interface controller of the computing device 100. As shown, the algorithm logic 204, the primitive offload logic 206, and the result logic 208 are established by the FPGA 130.

The primitive logic 210 is configured to perform a primitive task in response to encapsulation of the primitive task. The primitive logic 210 may perform a cryptographic mathematical primitive operation such as a modular exponentiation operation, a modular multiplicative inverse operation, a modular multiplication operation, and/or an elliptic curve operation. In some embodiments, the primitive logic 210 may perform a signal processing operation such as a fast Fourier transform operation. In some embodiments, the primitive logic 210 may perform a zero-knowledge proof operation or a digital random number generation operation. As shown, the primitive logic 210 is established by the ASIC 132. In some embodiments, the primitive logic 210 may include multiple bit streams that are each configured to perform a particular primitive task. The primitive logic 210 may include multiple bit streams that are capable of performing the same primitive task in parallel.

Figure 3A:
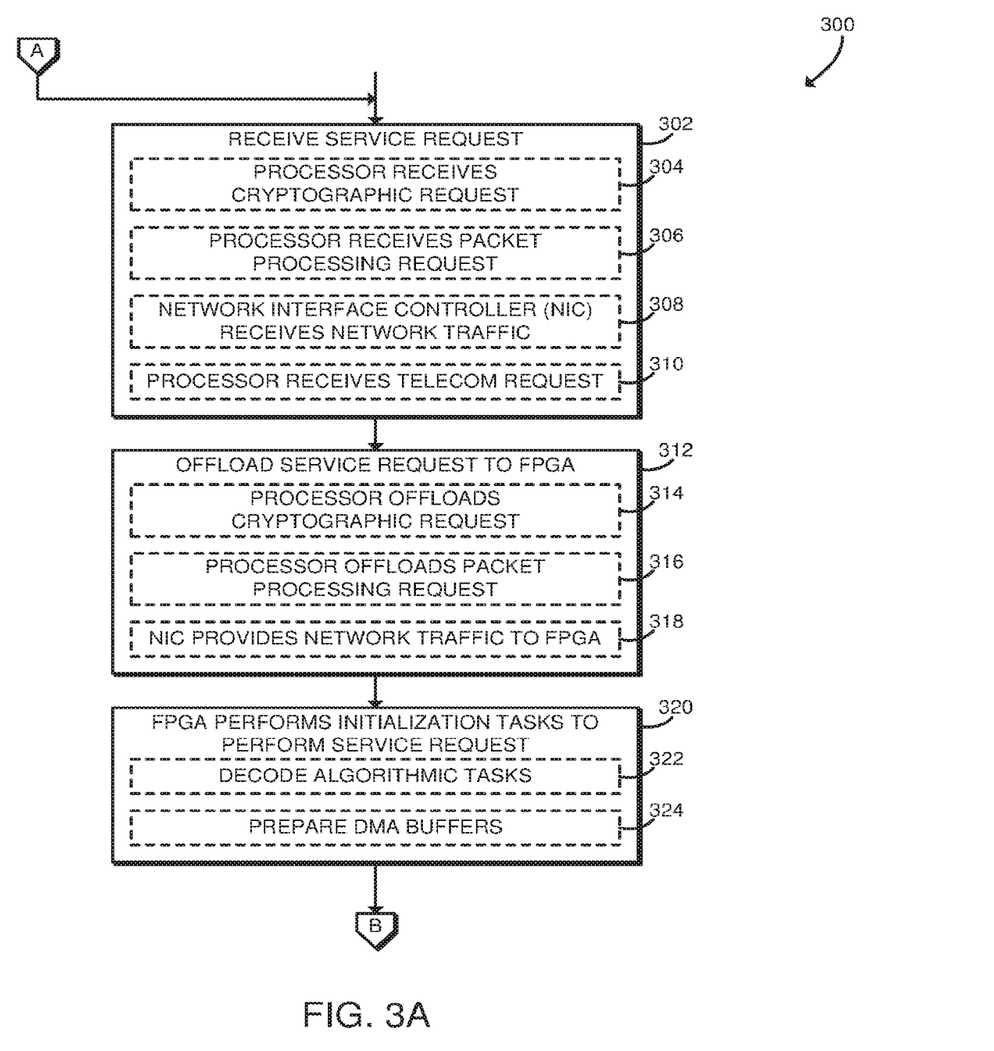
FIGS. 3A and 3B are a simplified flow diagram of at least one embodiment of a method for hybrid algorithm acceleration that may be executed by the computing device of FIGS. 1 and 2.
Figure 3B:
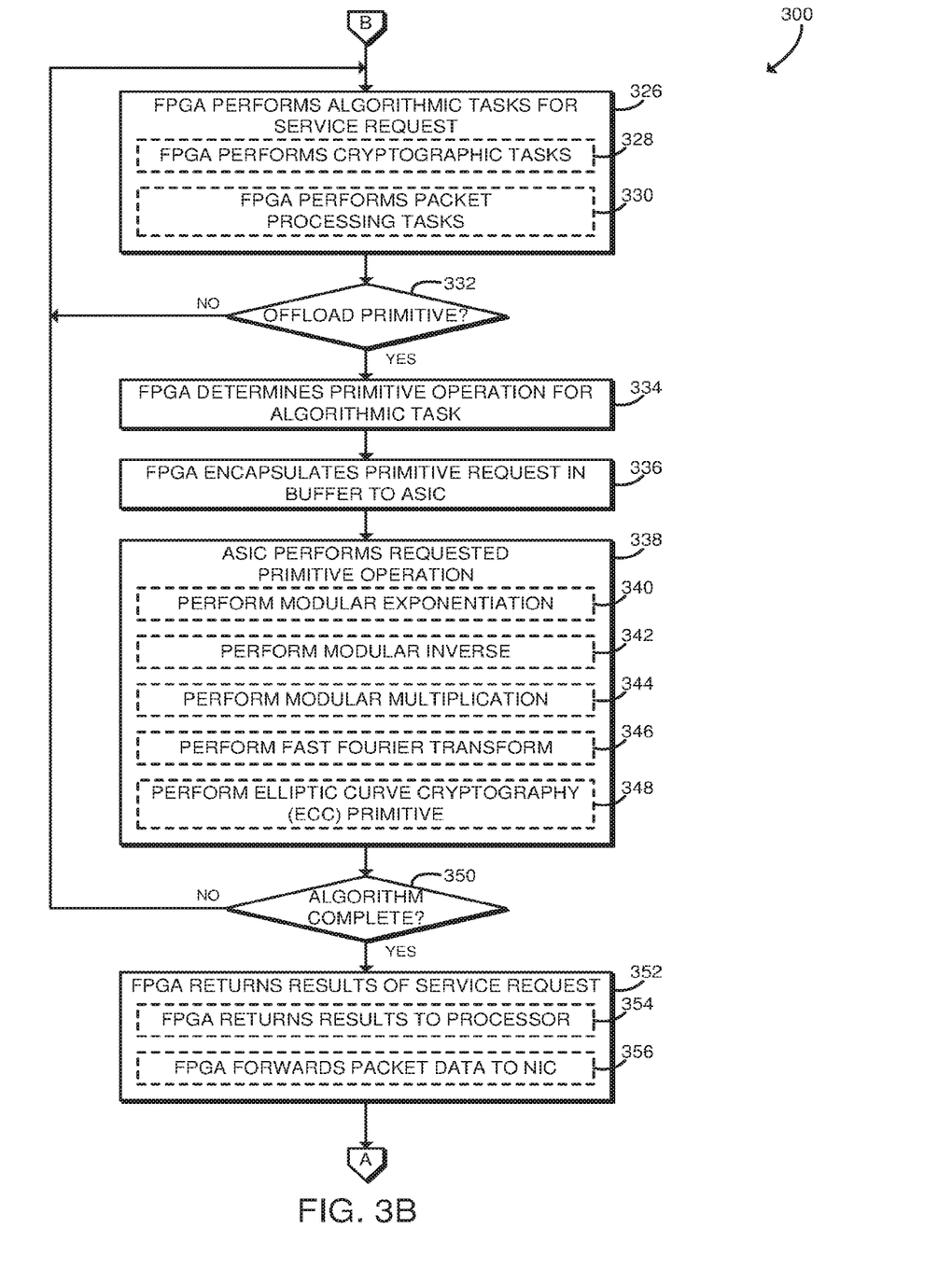

Referring now to FIGS. 3A and 3B, in use, the computing device 100 may execute a method 300 for hybrid code acceleration with an FPGA and an ASIC. It should be appreciated that, in some embodiments, the operations of the method 300 may be performed by one or more components of the environment 200 of the computing device 100 as shown in FIG. 2. The method 300 begins in block 302, in which the computing device 100 receives a service request. The service request may be embodied as any task, process, or other algorithm that should be performed by the computing device 100. In some embodiments, in block 304, the processor 120 may receive a cryptographic request. The cryptographic request may be embodied as any request to perform encryption, decryption, message authentication, or other cryptographic operation. The request may originate from application software, operating system software, and/or hardware of the computing device 100. For example, the computing device 100 may generate the cryptographic request to encrypt or decrypt network packet data.

In some embodiments, in block 306, the computing device 100 may receive a packet processing request. The packet processing request may be embodied as any request to send, receive, or otherwise communicate network packets using the communication subsystem 128. For example, the packet processing request may be embodied as a request to send one or more TCP/IP network packets. In some embodiments, the packet processing request may also include a request to encrypt or decrypt the packet data, such as a request to transmit IPsec encrypted packets and/or TLS encrypted packets. In some embodiments, in block 308 a network interface controller (NIC) of the computing device 100 may receive network packets for processing. For example, the NIC may receive TCP/IP traffic from one or more remote computing devices. The network traffic may include encrypted data, such as IPsec encrypted traffic and/or TLS encrypted traffic. The NIC may be included in or otherwise embodied as the communication subsystem 128.

In some embodiments, in block 310, the processor 120 may receive a telecommunications service request. For example, in some embodiments the processor 120 may receive a request to modulate a data stream to a carrier signal and/or to demodulate a carrier signal to a data stream.

In block 312, the computing device 100 offloads the service request to the FPGA 130. The computing device 100 may use any appropriate technique to offload the service request to the FPGA 130. For example, the computing device 100 may perform one or more direct memory access (DMA) operations to transfer data relating to the service request into an internal memory buffer of the FPGA 130. The data may be transferred via a high-speed connection interface such as PCI Express or QPI. In some embodiments, the computing device 100 may use a notification ring to notify the FPGA 130 of the service request. The notification ring may be embodied as a ring buffer accessible to the FPGA 130 that includes one or more pointers, descriptors, or other data indicative of the service request. The service request may be offloaded by the component that received the service request such as the processor 120 or the NIC. In some embodiments, in block 314, the processor 120 may offload a cryptographic request to the FPGA 130. In some embodiments, in block 316, the processor 120 may offload a packet processing request to the FPGA 130. For example, the processor 120 may offload a request to transmit certain data to a remote host. In some embodiments, in block 318 the NIC may provide network traffic to the FPGA 130. For example, the NIC may transfer network traffic data received from a remote host directly to a buffer of the FPGA 130.

In block 320, the FPGA 130 may perform one or more initialization tasks to perform the service request. The FPGA 130 may perform any tasks required to complete the service request, including initializing components of the FPGA 130 and/or the ASIC 132. In some embodiments, in block 322 the FPGA 130 may decode one or more algorithmic tasks for the service request. The FPGA 130 may, for example, identify an algorithm to complete the service request, including particular tasks to be performed by the FPGA 130 as well as particular primitive operations to be performed by the ASIC 132 to perform the algorithm, as described further below. In some embodiments, in block 324 the FPGA 130 may initialize one or more DMA buffers. The DMA buffers may receive data from the processor 120 and/or the NIC for processing. The DMA buffers may also be accessible to the ASIC 132 for processing primitive operations.

In block 326, shown in FIG. 3B, the FPGA 130 performs one or more algorithmic tasks for the service request. The algorithmic tasks may be embodied as any sequence or set of logical, computational, or other tasks that are executed by the FPGA 130 to perform the service request. The algorithmic tasks may include algorithm logic, pre-computed values, math operations that are not calculation-intensive, and/ or other tasks required by a particular algorithm. As described further below, each algorithmic task may call or otherwise depend on one or more primitive tasks, which are executed by the ASIC 132 as described below. Because the algorithmic tasks are performed by the FPGA 130 and not the ASIC 132, the overall algorithm and the algorithmic tasks may be more easily modified than the primitive tasks performed by the ASIC 132. In some embodiments, in block 328 the FPGA 130 may perform cryptographic tasks for a cryptographic algorithm. For example, the FPGA 130 may perform a cryptographic operation (e.g., encryption, decryption, verification, etc.) using a particular cryptographic algorithm or a particular mode of operation of the cryptographic algorithm. In some embodiments, in block 330 the PGA 130 may perform packet processing tasks. For example, the FPGA 130 may perform the operations of a TCP/IP networking stack, such as packet encapsulation and de-encapsulation, packet fragmentation and de-fragmentation, packet filtering, or other TPC/IP operations.

In block 332, the FPGA 130 determines whether to offload a primitive operation to the ASIC 132. As described below, a primitive operation may be offloaded in order to complete an algorithmic task or otherwise perform the service request. For example, an algorithmic task may include performance of the primitive operation, may depend on results of the primitive operation, or otherwise may have a dependency on the primitive operation. If the FPGA 130 determines not to offload a primitive operation, the method 300 loops back to block 326 to continue processing the algorithmic tasks with the FPGA 130. If the FPGA 130 determines to offload the primitive operation, the method 300 advances to block 334.

In block 334, the FPGA 130 determines the primitive operation to be performed for the algorithmic task. The primitive operation may be embodied as any operation performed by the ASIC 132 that is requested by the FPGA 130 to perform the algorithm. For example, the primitive operation may be embodied as a mathematically intensive operation that is part of a cryptographic algorithm, signal-processing algorithm, or other algorithm. In block 336, the FPGA 130 encapsulates a primitive request to the ASIC 132. The primitive request may be embodied as data that identifies the requested primitive operation as well as any associated data to be processed by the primitive operation. The primitive request may be communicated to the ASIC 132 using a high-speed connection interface, a shared DMA buffer, or other communication technique. For example, in some embodiments the FPGA 130 may use a notification ring to notify the ASIC 132 of primitive requests. The FPGA 130 may, for example, store the primitive request or data indicative of the primitive request in the notification ring. The ASIC 132 may then read the primitive request from the notification ring.

In block 338, the ASIC 132 performs the requested primitive operation. The requested primitive operation may be embodied as a mathematical operation or other computationally intensive operation performed by the ASIC 132. The primitive operation may be used by multiple different algorithms, thus allowing the ASIC 132 to be reused without modification for new algorithms or updated algorithms. The ASIC 132 may perform the primitive operation on data included in a shared DMA buffer of the FPGA 130 and/or in the main memory 124 of the computing device 100. Similarly, the ASIC 132 may write output data into the shared DMA buffer of the FPGA 130 and/or the memory 124. The ASIC 132 may perform one or more DMA operations to read input data and/or write output data. After completing the primitive operation, the ASIC 132 may signal to the FPGA 130 that the primitive operation is complete using a notification ring. As described above, the ASIC 132 may perform a computationally intense operation useful for cryptographic algorithms, packet processing algorithms, telecommunication algorithms, or other algorithms. In some embodiments, in block 340, the ASIC 132 may perform a modular exponentiation operation. In some embodiments, in block 342, the ASIC 132 may perform a modular multiplicative inverse operation. In some embodiments, in block 344, the ASIC 132 may perform a modular multiplication operation. In some embodiments, in block 346, the ASIC 132 may perform a fast Fourier transform (FFT) operation. The FFT operation may be used, for example, by a modulation-demodulation algorithm used to perform a telecom service request. In some embodiments, in block 348, the ASIC 132 may perform an elliptic curve cryptography (ECC) operation.

In block 350, the FPGA 130 determines whether the algorithm is complete. The FPGA 130 may determine, for example, whether additional algorithmic tasks remain and/or whether the ASIC 132 has completed all offloaded primitive tasks. If the algorithm is not complete, the method 300 loops back to block 326 to continue processing the algorithm. If the algorithm is complete, the method 300 advances to block 352.

In block 352, the FPGA 130 returns the results of the service request. The computing device 100 may use any appropriate technique to return the results from the FPGA 130. For example, the computing device 100 may perform one or more DMA operations to transfer results data for the service request from an internal memory buffer of the FPGA 130. The data may be transferred via a high-speed connection interface such as PCI Express or QPI. In some embodiments, the FPGA 130 may use a notification ring to notify another component (e.g., the processor 120 or the NIC) of the results. The results may be returned to the component that offloaded the service request or to a different component. In some embodiments, in block 354 the FPGA 130 may return results to the processor 120. For example, the FPGA 130 may return results of a cryptographic service request to the processor 120. As another example, the FPGA 130 may provide processed network data (which may be decrypted) received from a remote host to the processor 120. In some embodiments, in block 356 the FPGA 130 may forward one or more data packets (which may be encrypted) to the NIC for transmission to a remote host. After returning the results of the service request, the method 300 loops back to block 302, shown in FIG. 3A, to process additional service requests.

Figure 4:
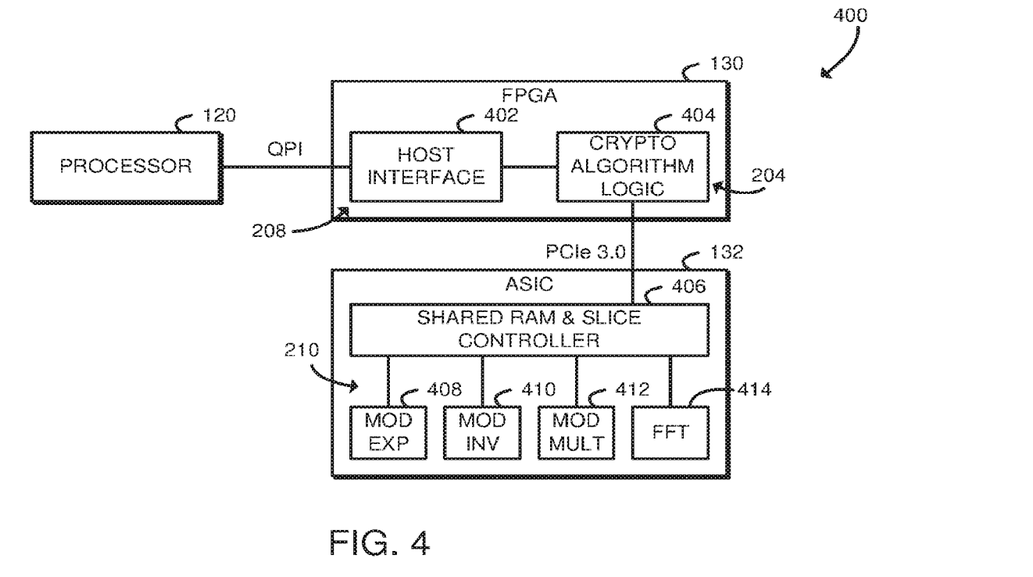
FIG. 4 is a simplified block diagram of at least one embodiment of the computing device of FIGS. 1-2.

Referring now to FIG. 4, diagram 400 illustrates one potential embodiment of the computing device 100 for performing cryptographic acceleration. As shown, the computing device 100 includes the processor 120, the FPGA 130, and the ASIC 132. Illustratively, the processor 120 is coupled to the FPGA 130 via a QuickPath interconnect (QPI) connection, and the FPGA 130 is coupled to the ASIC 132 via a PCI Express 3.0 connection. The FPGA 130 includes a host interface 402 and cryptographic algorithm logic 404. The host interface 402 communicates with the processor 120 and may include a ring bundle and direct memory access (DMA) buffers. The host interface 402 may, for example, receive offloaded cryptographic service requests from the processor 120 and provide results of the cryptographic service requests to the processor 120. The cryptographic algorithm logic 404 performs algorithmic tasks for a cryptographic algorithm such as ECDSA, SM2, SM4, or other cryptographic algorithm. The cryptographic algorithm logic 404 may be updated for newly published or updated cryptographic algorithms. As shown, the cryptographic algorithm logic 404 may perform the functions of the algorithm logic 204 and the host interface 402 may perform the functions of the result logic 208.

The ASIC 132 includes a shared RAM and slice controller 406 and multiple primitive logic 210 components. In particular, the ASIC 132 includes modular exponentiation logic 408, modular multiplicative inverse logic 410, modular multiplication logic 412, and fast Fourier transform. (FFT) logic 414. The shared RAM and slice controller 406 may include data buffers shared between the primitive logic 210 components and may otherwise control the flow of data between the FPGA 130 and the ASIC 132. As described above, the primitive logic 210 components (e.g., the modular exponentiation logic 408, the modular multiplicative inverse logic 410, and/or the modular multiplication logic 412) may be called by the cryptographic algorithm logic 404 to perform computationally intensive operations included in the cryptographic algorithm. As shown, the ASIC 132 may also be capable of other primitive operations not used for the cryptographic algorithm (e.g., the FFT logic 414). As shown in FIG. 4, input data and results data may be copied or otherwise transferred between the processor 120, the FPGA 130, and/or the ASIC 132. In some embodiments, data may be stored in one or more DMA buffers shared by the processor 120, the FPGA 130, and/or the ASIC 132.

Figure 5:
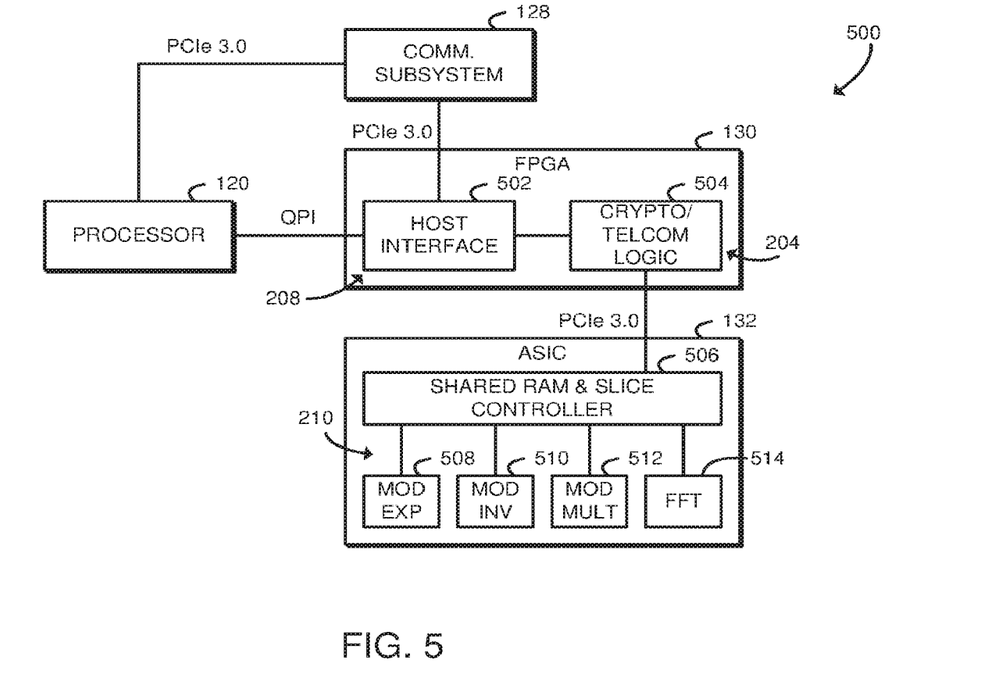
FIG. 5 is a simplified block diagram of at least one embodiment of the computing device of FIGS. 1-2.

Referring now to FIG. 5, diagram 500 illustrates one potential embodiment of the computing device 100 for performing inline IPsec processing. As shown, the computing device 100 includes the processor 120, the communication subsystem 128, the FPGA 130, and the ASIC 132. Illustratively, the processor 120 is coupled to the FPGA 130 via a QuickPath Interconnect (QM) connection, the communication subsystem 128 (i.e., a network interface controller of the communication subsystem 128) is coupled to the processor 120 and the FPGA 130 via PCI Express 3.0 connections, and the FPGA 130 is coupled to the ASIC 132 via a PCI Express 3.0 connection. The FPGA 130 includes a host interface 502 and cryptographic/telcom logic 504. The host interface 502 communicates with the processor 120 and the communication subsystem 128, and may include a ring bundle and direct memory access (DMA) buffers. The host interface 502 may, for example, receive network data for transmission from the processor 120 and forward encrypted network data to communication subsystem 128. As another example, the host interface 502 may receive encrypted network traffic from the communication subsystem 128 and forward decrypted network data to the processor 120. The cryptographic/telcom logic 504 performs packet processing tasks including inline IPsec data encryption. In particular, the cryptographic/telcom logic 504 may perform IP packet fragmentation/de-fragmentation and then perform IPsec encryption or decryption. As shown, the cryptographic/telcom logic 504 may perform the functions of the algorithm logic 204 and the host interface 502 may perform the functions of the result logic 208.

Similar to the ASIC 132 shown in FIG. 4, the ASIC 132 of FIG. 5 includes a shared RAM and slice controller 506 and multiple primitive logic 210 components. In particular, the ASIC 132 includes modular exponentiation logic 508, modular multiplicative inverse logic 510, modular multiplication logic 512, and fast Fourier transform (FFT) logic 514. The shared RAM and slice controller 506 may include data buffers shared between the primitive logic 210 components and may otherwise control the flow of data between the FPGA 130 and the ASIC 132. As described above, the primitive logic 210 components (e.g., the modular exponentiation logic 508, the modular multiplicative inverse logic 510, and/or the modular multiplication logic 512) may be called by the cryptographic/telcom logic 504 to perform computationally intensive operations during inline IPsec packet processing. As shown, the ASIC 132 may also be capable of other primitive operations not used for IPsec packet processing (e.g., the FFT logic 514, which may be used for a modulation-demodulation algorithm). As shown in FIG. 5, input data and results data may be copied or otherwise transferred between the processor 120, the communication subsystem 128, the FPGA 130, and/or the ASIC 132. In some embodiments, data may be stored in one or more DMA buffers shared by the processor 120, the communication subsystem 128, the FPGA 130, and/or the ASIC 132.

Figure 6:
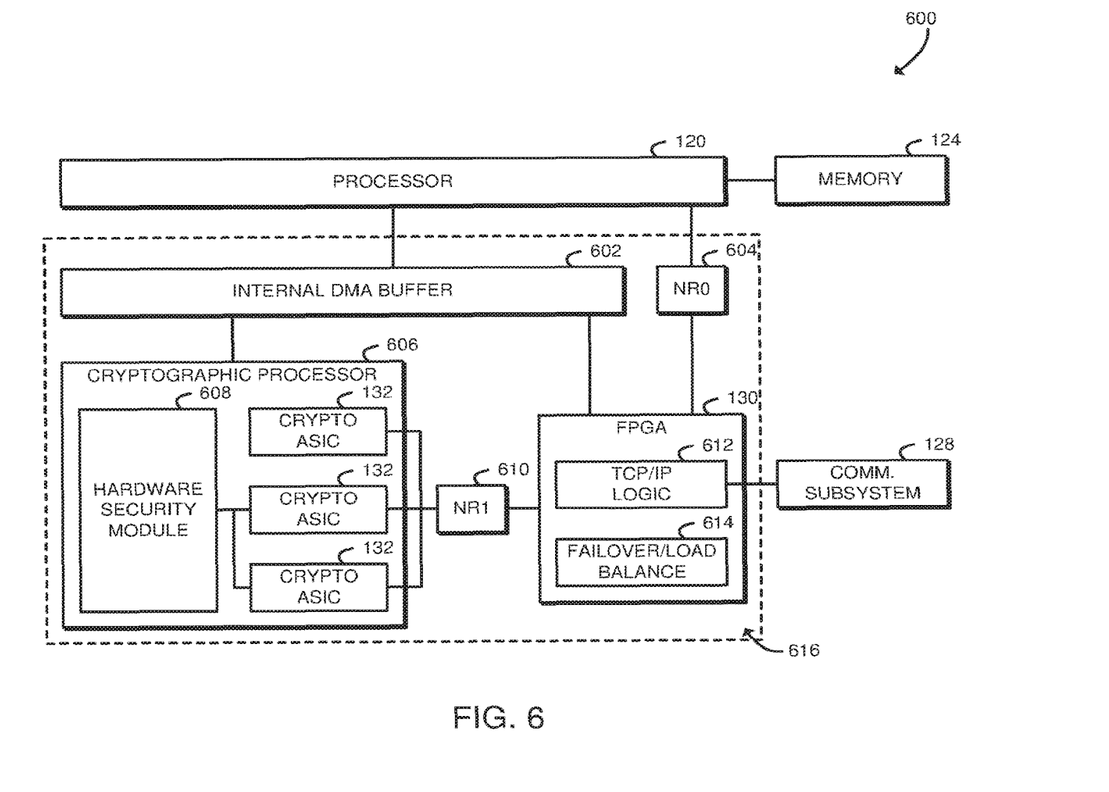
FIG. 6 is a simplified block diagram of at least one embodiment of the computing device of FIGS. 1-2.

Referring now to FIG. 6, diagram 600 illustrates one potential embodiment of the computing device 100 for performing inline TLS processing. As shown, the computing device 100 includes the processor 120 coupled to the memory 124. The processor 120 is further coupled to an internal DMA buffer 602 that is common to the FPGA 130 and a cryptographic processor 606. The illustrative cryptographic processor 606 includes multiple instances of a cryptographic ASIC 132. Each cryptographic ASIC 132 may perform cryptographic primitive operations such as modular exponentiation, modular multiplicative inverse, and modular multiplication, similar to the ASICS 132 shown in FIGS. 4 and 5. The cryptographic processor 606 further includes a hardware security module 608, which may be embodied as a hardened or otherwise tamper-resistant component for security key management and storage. For example, the hardware security module 608 may be embodied as a converged security and manageability engine (CSME), a trusted platform module (TPM), a secure enclave created using Intel® SGX, or other trusted execution environment of the computing device 100. As shown, the processor 120 may communicate with the FPGA 130 using a notification ring NR0 604, and the FPGA 130 may communicate with the cryptographic ASICs 132 using a notification ring NR1 610. Each of the notification rings 604, 610 may be embodied as a ring buffer in the internal DMA buffer 602 that may be used to transfer pointers, descriptors, or other data encapsulating requests and associated data between the processor 120, the FPGA 130, and the ASICs 132. As shown, the FPGA 130 further includes TCP/IP logic 612 and failover/load balance logic 614. The TCP/IP logic 612 provides a TCP/IP stack for processing incoming and outgoing data. In particular, the TCP/IP logic 612 performs TCP/IP processing for network data received from the processor 120 and provided to the communication subsystem 128 for transmission to remote hosts as well as TCP/IP processing for network data from other hosts received from the communication subsystem 128 and provided to the processor 120. The failover/load balance logic 614 offloads cryptographic operations to the cryptographic ASICs 132 to provide inline TIS encryption and decryption. The failover/load balance logic 614 may coordinate and balance utilization of the ASICs 132, which may allow the computing device 100 to scale with the number of processor 120 threads dedicated to TLS offload. For example, the ASICs 132 may include multiple instances of the same type of offload bit streams so that multiple instances of the same operation (e.g., modular multiplication operations, zero-knowledge proofs, etc.) may be performed in parallel using the multiple bit streams. In some embodiments, the FPGA 130 may implement additional offload hit streams that may be used only when the bit streams resources of the ASICs are busy or otherwise unavailable. As shown, in some embodiments the internal DMA buffer 602, the cryptographic processor 606 and the FPGA 130 may be included in a hybrid offload engine 616.

In use, the communication subsystem 128 may receive network packet data from a remote host and provide the network packet data directly to the FPGA 130. The TCP/IP logic 612 of the FPGA 130 processes the incoming network packet data, and after being processed, the packet data is stored in the internal DMA buffer 602. The FPGA 130 determines whether cryptographic operations are required for the network packet data. If not, the FPGA 130 notifies the processor 120 of the new network packet data using the notification ring NR0 604. In response, the processor 120 retrieves the network packet data from the internal DMA buffer 602 using a PCI Express transaction. If the FPGA 130 determines that cryptographic operations are required for the network packet data, the FPGA 130 sends a notification to the cryptographic ASICs 132 using the notification ring NR1 610. The failover/load balancing logic 614 may select a target cryptographic ASIC 132 based on a failover/load balancing policy. In response to the notification, the cryptographic ASIC 132 retrieves the input data from the internal DMA buffer 602. The cryptographic ASIC 132 may also retrieve secret keys or other sensitive data from the hardware security module 608. After retrieving the input data and any required keys, the cryptographic ASIC 132 performs the requested cryptographic operation and pushes the processed data hack into the internal DMA buffer 602. Thus, the ASIC 132 may perform inline encryption by replacing plaintext with cipher text in the network frame or inline decryption by replacing cipher text with plaintext in the network frame. The cryptographic ASIC 132 notifies the FPGA 130 that the operation is complete using the notification ring NR1 610. After receiving the notification, the FPGA 130 notifies the processor 120 and the processor 120 may retrieve the processed data as described above.

It should be appreciated that, in some embodiments, the method 300 may be embodied as various instructions stored on a computer-readable media, which may be executed by the processor 120, the FPGA 130, the ASIC 132, and/or other components of the computing device 100 to cause the computing device 100 to perform the method 300. The computer-readable media may be embodied as any type of media capable of being read by the computing device 100 including, but not limited to, the memory 124, the data storage device 126, firmware devices, other memory or data storage devices of the computing device 100, portable media readable by a peripheral device 134 of the computing device 100, and/or other media.

EXAMPLES

Illustrative examples of the technologies disclosed herein are provided below. An embodiment of the technologies may include any one or more, and any combination of, the examples described below.

Example 1 includes a computing device for algorithm acceleration, the computing device comprising: a field-programmable gate array (FPGA); an application-specific integrated circuit (ASIC); and an offload manager to offload a service request to the FPGA of the computing device; wherein the FPGA comprises: algorithm logic to (i) perform one or more algorithm tasks of an algorithm to perform the service request and (ii) determine a primitive task associated with an algorithm task; primitive offload logic to encapsulate the primitive task in a buffer of the FPGA, wherein the buffer is accessible by the ASIC of the computing device; and result logic to return one or more results of the service request in response to performance of the one or more algorithm tasks and performance of the primitive task by the ASIC; and wherein the ASIC comprises primitive logic to perform the primitive task in response to encapsulation of the primitive task.

Example 2 includes the subject matter of Example 1, and wherein the service request comprises a cryptographic service request and the algorithm comprises a cryptographic algorithm.

Example 3 includes the subject matter of any of Examples 1 and 2, and wherein the cryptographic algorithm comprises a cryptographic mode of operation.

Example 4 includes the subject matter of any of Examples 1-3, and wherein the service request comprises a packet processing service request and the algorithm comprises a packet processing algorithm.

Example 5 includes the subject matter of any of Examples 1-4, and wherein the packet processing algorithm comprises a TCP/IP packet processing algorithm.

Example 6 includes the subject matter of any of Examples 1-5, and wherein the service request comprises a telecommunications service request and the algorithm comprises a modulation-demodulation algorithm.

Example 7 includes the subject matter of any of Examples 1-6, and wherein to offload the service request comprises to offload the service request from a processor of the computing device to the FPGA.

Example 8 includes the subject matter of any of Examples 1-7, and wherein to offload the service request comprises to offload the service request from a network interface controller of the computing device to the FPGA.

Example 9 includes the subject matter of any of Examples 1-8, and wherein the algorithm logic is further to determine the one or more algorithm tasks of the algorithm in response to an offload of the service request.

Example 10 includes the subject matter of any of Examples 1-9, and wherein to perform the primitive task comprises to perform a cryptographic mathematical primitive operation.

Example 11 includes the subject matter of any of Examples 1-10, and wherein the primitive task comprises a modular exponentiation operation.

Example 12 includes the subject matter of any of Examples 1-11, and wherein the primitive task comprises a modular multiplicative inverse operation.

Example 13 includes the subject matter of any of Examples 1-12, and wherein the primitive task comprises a modular multiplication operation.

Example 14 includes the subject matter of any of Examples 1-13, and wherein the primitive task comprises an elliptic curve operation.

Example 15 includes the subject matter of any of Examples 1-14, and wherein to perform the primitive task comprises to perform a signal processing operation.

Example 16 includes the subject matter of any of Examples 1-15, and wherein the primitive task comprises a fast Fourier transform operation.

Example 17 includes the subject matter of any of Examples 1-16, and wherein to perform the primitive task comprises to perform a zero-knowledge proof operation.

Example 18 includes the subject matter of any of Examples 1-17, and wherein to perform the primitive task comprises to perform a digital random number generation operation.

Example 19 includes the subject matter of any of Examples 1-18, and wherein: the primitive logic of the ASIC comprises a plurality of bit streams, wherein each bit stream is configured to perform the primitive task; and the primitive offload logic of the FPGA is to load-balance a plurality of primitive tasks among the plurality of bit streams of the ASIC.

Example 20 includes the subject matter of any of Examples 1-19, and wherein the primitive offload logic of the FPGA is to (i) determine whether the plurality of bit streams of the ASIC are unavailable and (ii) perform the primitive task in response to a determination that the plurality of bit streams of the ASIC are unavailable.

Example 21 includes the subject matter of any of Examples 1-20, and wherein to return the one or more results of the service request comprises to return the results from the FPGA to a processor of the computing device.

Example 22 includes the subject matter of any of Examples 1-21, and wherein to return the one or more results of the service request comprises to forward the results from the FPGA to a network interface controller of the computing device.

Example 23 includes a method for algorithm acceleration, the method comprising: offloading, by a computing device, a service request to a field-programmable gate array (FPGA) of the computing device; performing, by the FPGA of the computing device, one or more algorithm tasks of an algorithm to perform the service request; determining, by the FPGA of the computing device, a primitive task associated with an algorithm task; encapsulating, by the FPGA of the computing device, the primitive task in a buffer of the FPGA, wherein the buffer is accessible by an application-specific integrated circuit (ASIC) of the computing device; performing, by the ASIC, the primitive task in response to encapsulating the primitive task; and returning, by the FPGA, one or more results of the service request in response to performing the one or more algorithm tasks and performing the primitive task.

Example 24 includes the subject matter of Example 23, and wherein the service request comprises a cryptographic service request and the algorithm comprises a cryptographic algorithm.

Example 25 includes the subject matter of any of Examples 23 and 24, and wherein the cryptographic algorithm comprises a cryptographic mode of operation.

Example 26 includes the subject matter of any of Examples 23-25, and wherein the service request comprises a packet processing service request and the algorithm comprises a packet processing algorithm.

Example 27 includes the subject matter of any of Examples 23-26, and wherein the packet processing algorithm comprises a TCP/IP packet processing algorithm.

Example 28 includes the subject matter of any of Examples 23-27, and wherein the service request comprises a telecommunications service request and the algorithm comprises a modulation-demodulation algorithm.

Example 29 includes the subject matter of any of Examples 23-28, and wherein offloading the service request comprises offloading the service request from a processor of the computing device to the FPGA.

Example 30 includes the subject matter of any of Examples 23-29, and wherein offloading the service request comprises offloading the service request from a network interface controller of the computing device to the FPGA.

Example 31 includes the subject matter of any of Examples 23-30, and further comprising determining, by the FPGA of the computing device, the one or more algorithm tasks of the algorithm in response to offloading the service request.

Example 32 includes the subject matter of any of Examples 23-31, and wherein performing the primitive task comprises performing a cryptographic mathematical primitive operation.

Example 33 includes the subject matter of any of Examples 23-32, and wherein performing the primitive task comprises performing a modular exponentiation operation.

Example 34 includes the subject matter of any of Examples 23-33, and wherein performing the primitive task comprises performing a modular multiplicative inverse operation.

Example 35 includes the subject matter of any of Examples 23-34, and wherein performing the primitive task comprises performing a modular multiplication operation.

Example 36 includes the subject matter of any of Examples 23-35, and wherein performing the primitive task comprises performing an elliptic curve operation.

Example 37 includes the subject matter of any of Examples 23-36, and wherein performing the primitive task comprises performing a signal processing operation.

Example 38 includes the subject matter of any of Examples 23-37, and wherein performing the primitive task comprises performing a fast Fourier transform operation.

Example 39 includes the subject matter of any of Examples 23-38, and wherein performing the primitive task comprises performing a zero-knowledge proof operation.

Example 40 includes the subject matter of any of Examples 23-39, and wherein performing the primitive task comprises performing a digital random number generation operation.

Example 41 includes the subject matter of any of Examples 23-40, and further comprising load-balancing, by the FGPA, a plurality of primitive tasks among a plurality of bit streams of the ASIC, wherein each bit stream of the ASIC is configured to perform the primitive task.

Example 42 includes the subject matter of any of Examples 23-41, and further comprising: determining, by the FPGA, whether the plurality of bit streams of the ASIC are unavailable; and performing, by the FGPA, the primitive task in response to determining that the plurality of bit streams of the ASIC are unavailable.

Example 43 includes the subject matter of any of Examples 23-42, and wherein returning the one or more results of the service request comprises returning the results from the FPGA to a processor of the computing device.

Example 44 includes the subject matter of any of Examples 23-43, and wherein returning the one or more results of the service request comprises forwarding the results from the FPGA to a network interface controller of the computing device.

Example 45 includes a computing device comprising: a processor; and a memory having stored therein a plurality of instructions that when executed by the processor cause the computing device to perform the method of any of Examples 23-44.

Example 46 includes one or more machine readable storage media comprising a plurality of instructions stored thereon that in response to being executed result in a computing device performing the method of any of Examples 23-44.

Example 47 includes a computing device comprising means for performing the method of any of Examples 23-44.

Example 48 includes a computing device for algorithm acceleration, the computing device comprising: means for offloading a service request to a field-programmable gate array (FPGA) of the computing device; means for performing, by the FPGA, one or more algorithm tasks of an algorithm to perform the service request; means for determining, by the FPGA, a primitive task associated with an algorithm task; means for encapsulating, by the FPGA, the primitive task in a buffer of the FPGA, wherein the buffer is accessible by an application-specific integrated circuit (ASIC) of the computing device; means for performing, by the ASIC, the primitive task in response to encapsulating the primitive task; and means for returning, by the FPGA, one or more results of the service request in response to performing the one or more algorithm tasks and performing the primitive task.

Example 49 includes the subject matter of Example 48, and wherein the service request comprises a cryptographic service request and the algorithm comprises a cryptographic algorithm.

Example 50 includes the subject matter of any of Examples 48 and 49, and wherein the cryptographic algorithm comprises a cryptographic mode of operation.

Example 51 includes the subject matter of any of Examples 48-50, and wherein the service request comprises a packet processing service request and the algorithm comprises a packet processing algorithm.

Example 52 includes the subject matter of any of Examples 48-51, and wherein the packet processing algorithm comprises a TCP/IP packet processing algorithm.

Example 53 includes the subject matter of any of Examples 48-52, and wherein the service request comprises a telecommunications service request and the algorithm comprises a modulation-demodulation algorithm.

Example 54 includes the subject matter of any of Examples 48-53, and wherein the means for offloading the service request comprises means for offloading the service request from a processor of the computing device to the FPGA.

Example 55 includes the subject matter of any of Examples 48-54, and wherein the means for offloading the service request comprises means for offloading the service request from a network interface controller of the computing device to the FPGA.

Example 56 includes the subject matter of any of Examples 48-55, and further comprising means for determining, by the FPGA, the one or more algorithm tasks of the algorithm in response to offloading the service request.

Example 57 includes the subject matter of any of Examples 48-56, and wherein the means for performing the primitive task comprises means for performing a cryptographic mathematical primitive operation.

Example 58 includes the subject matter of any of Examples 48-57, and wherein the means for performing the primitive task comprises means for performing a modular exponentiation operation.

Example 59 includes the subject matter of any of Examples 48-58, and wherein the means for performing the primitive task comprises means for performing a modular multiplicative inverse operation.

Example 60 includes the subject matter of any of Examples 48-59, and wherein the means for performing the primitive task comprises means for performing a modular multiplication operation.

Example 61 includes the subject matter of any of Examples 48-60, and wherein the means for performing the primitive task comprises means for performing an elliptic curve operation.

Example 62 includes the subject matter of any of Examples 48-61, and wherein the means for performing the primitive task comprises means for performing a signal processing operation.

Example 63 includes the subject matter of any of Examples 48-62, and wherein the means for performing the primitive task comprises means for performing a fast Fourier transform operation.

Example 64 includes the subject matter of any of Examples 48-63, and wherein the means for performing the primitive task comprises means for performing a zero-knowledge proof operation.

Example 65 includes the subject matter of any of Examples 48-64, and wherein the means for performing the primitive ask comprises means for performing a digital random number generation operation.

Example 66 includes the subject matter of any of Examples 48-65, and further comprising means for load-balancing, by the FGPA, a plurality primitive tasks among a plurality of bit streams of the ASIC, herein each bit stream of the ASIC is configured to perform the primitive task.

Example 67 includes the subject matter of any of Examples 48-66, and further comprising: means for determining, by the FPGA, whether the plurality of bit streams of the ASIC are unavailable; and means for performing, by the FGPA, the primitive task in response to determining that the plurality of bit streams of the ASIC are unavailable.

Example 68 includes the subject matter of any of Examples 48-67, and wherein the means for returning the one or more results of the service, request comprises means for returning the results from the FPGA to a processor of the computing device.

Example 69 includes the subject matter of any of Examples 48-68, and wherein the means for returning the one or more results of the service request comprises means for forwarding the results from the FPGA to a network interface controller of the computing device.

The invention claimed is:
1. A computing device comprising:
a field-programmable gate array (FPGA);
an application-specific integrated circuit (ASIC); and
an offload manager to offload a service request to the FPGA of the computing device;
wherein the FPGA comprises:
algorithm circuitry to perform one or more algorithm tasks of an algorithm to perform the service request and determine a primitive task associated with an algorithm task of the one or more algorithm tasks;

primitive offload circuitry to encapsulate the primitive task in a buffer of the FPGA, wherein the buffer is accessible by the ASIC of the computing device; and result circuitry to return one or more results of the service request in response to performance of the primitive task by the ASIC.

2. The computing device of claim 1, wherein the service request comprises a cryptographic service request and the algorithm comprises a cryptographic algorithm.

3. The computing device of claim 1, wherein the service request comprises a packet processing service request and the algorithm comprises a packet processing algorithm.

4. The computing device of claim 1, wherein to offload the service request comprises to offload the service request from a processor of the computing device to the FPGA.

5. The computing device of claim 1, wherein to offload the service request comprises to offload the service request from a network interface controller of the computing device to the FPGA.

6. The computing device of claim 1, wherein the algorithm circuitry is further to determine the one or more algorithm tasks of the algorithm in response to the offload of the service request.

7. The computing device of claim 1, wherein the ASIC comprises primitive circuitry to perform the primitive task in response to encapsulation of the primitive task, and wherein to perform the primitive task comprises to perform a cryptographic mathematical primitive operation.

8. The computing device of claim 1, wherein the ASIC comprises primitive circuitry to perform the primitive task in response to encapsulation of the primitive task, and wherein to perform the primitive task comprises to perform a signal processing operation.

9. The computing device of claim 1, wherein the ASIC comprises primitive circuitry to perform the primitive task in response to encapsulation of the primitive task, and wherein:
the primitive circuitry of the ASIC comprises a plurality of bit streams, wherein each bit stream is configured to perform the primitive task; and
the primitive offload logic of the FPGA is to load-balance a plurality of primitive tasks among the plurality of bit streams of the ASIC.

10. The computing device of claim 1, wherein to return the one or more results of the service request comprises to return the results from the FPGA to a processor of the computing device.

11. The computing device of claim 1, wherein to return the one or more results of the service request comprises to forward the results from the FPGA to a network interface controller of the computing device.

12. A method comprising:
offloading, by a computing device, a service request to a field-programmable gate array (FPGA) of the computing device;
performing, by the FPGA of the computing device, one or more algorithm tasks of an algorithm to perform the service request;
determining, by the FPGA of the computing device, a primitive task associated with an algorithm task;
encapsulating, by the FPGA of the computing device, the primitive task in a buffer of the FPGA, wherein the buffer is accessible by an application-specific integrated circuit (ASIC) of the computing device; and
returning, by the FPGA, one or more results of the service request in response to the ASIC performing the primitive task.

13. The method of claim 12, wherein the service request comprises a cryptographic service request and the algorithm comprises a cryptographic algorithm.

14. The method of claim 12, wherein the service request comprises a packet processing service request and the algorithm comprises a packet processing algorithm.

15. The method of claim 12, further comprising determining, by the FPGA of the computing device, the one or more algorithm tasks of the algorithm in response to offloading the service request.

16. The method of claim 12, wherein the ASIC to perform the primitive task comprises performing a cryptographic mathematical primitive operation.

17. The method of claim 12, wherein the ASIC to perform the primitive task comprises performing a signal processing operation.

18. The method of claim 12, further comprising load-balancing, by the FGPA, a plurality of primitive tasks among a plurality of bit streams of the ASIC, wherein each bit stream of the ASIC is configured to perform the primitive task.

19. A non-transitory computer-readable storage media comprising a plurality of instructions that in response to being executed cause a computing device to:
offloading, by the computing device, a service request to a field-programmable gate array (FPGA) of the computing device;
performing, by the FPGA of the computing device, one or more algorithm tasks of an algorithm to perform the service request;
determining, by the FPGA of the computing device, a primitive task associated with an algorithm task;
encapsulating, by the FPGA of the computing device, the primitive task in a buffer of the FPGA, wherein the buffer is accessible by an application-specific integrated circuit (ASIC) of the computing device; and
returning, by the FPGA, one or more results of the service request in response to the ASIC performing the primitive task.

20. The non-transitory computer-readable storage media of claim 19, wherein the service request comprises a cryptographic service request and the algorithm comprises a cryptographic algorithm.

* * * * *